United States Patent
Chen

(10) Patent No.: US 8,213,958 B2
(45) Date of Patent: Jul. 3, 2012

(54) ELECTRONIC DEVICE AND METHOD FOR MANAGING CALL RECORDS

(75) Inventor: Mu-Ann Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 261 days.

(21) Appl. No.: 12/648,058

(22) Filed: Dec. 28, 2009

(65) Prior Publication Data

US 2010/0304723 A1    Dec. 2, 2010

(30) Foreign Application Priority Data

May 26, 2009    (CN) .......................... 2009 1 0302636

(51) Int. Cl.
*H04W 24/00*    (2009.01)
*H04M 3/42*    (2006.01)
*H04B 1/38*    (2006.01)

(52) U.S. Cl. .............. 455/456.1; 455/456.3; 455/457; 455/665; 455/414.1

(58) Field of Classification Search .......... 455/456, 455/456.4, 567, 456.1, 456.3, 457, 566, 414.1
See application file for complete search history.

(56) References Cited

U.S. PATENT DOCUMENTS

| | | | | |
|---|---|---|---|---|
| 5,155,689 A | * | 10/1992 | Wortham | 455/456.3 |
| 6,385,465 B1 | * | 5/2002 | Yoshioka | 455/564 |
| 6,654,684 B2 | * | 11/2003 | Shinada et al. | 701/211 |
| 6,879,846 B1 | * | 4/2005 | Miyata | 455/566 |
| 6,985,723 B2 | * | 1/2006 | Kil | 455/426.1 |
| 7,010,306 B1 | * | 3/2006 | Tanibayashi et al. | 455/456.1 |
| 7,797,019 B2 | * | 9/2010 | Friedmann | 455/556.1 |
| 8,031,050 B2 | * | 10/2011 | Johnson | 340/8.1 |
| 8,060,389 B2 | * | 11/2011 | Johnson | 705/6 |
| 8,073,565 B2 | * | 12/2011 | Johnson | 700/245 |
| 8,108,144 B2 | * | 1/2012 | Forstall et al. | 340/988 |

* cited by examiner

*Primary Examiner* — Tilahun B Gesesse
(74) *Attorney, Agent, or Firm* — Altis Law Group, Inc.

(57) ABSTRACT

An electronic device and a method for managing call records includes presetting a virtual icon corresponding to each call types; obtaining current position information of the electronic device from the GPS when a call is established and generating a call record when the call is finished. The electronic device and method for managing call records further include determining the call type of the call from the call record, and finding the location on a map of the electronic device according the recorded position information, and marking the corresponding virtual icon at the location on the map.

15 Claims, 4 Drawing Sheets

ELECTRONIC DEVICE AND METHOD FOR MANAGING CALL RECORDS

BACKGROUND

1. Technical Field

Embodiments of the present disclosure relate to data management, and more particularly to an electronic device and method for managing call records in the electronic device.

2. Description of Related Art

Mobile phones may store call records, which comprise a date and time of when a specific call was made and/or received. These call records can be reviewed for reference. However, these call records do not list locations of the made/received calls.

What is needed, therefore, is an improved electronic device and method for managing call records in the electronic device.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may included connected logic units, such as gates and flip-flops, and may include programmable units, such as programmable gate arrays or processors. The modules described herein may be implemented as either software and/or hardware modules and may be stored in any type of computer-readable medium or other computer storage system.

Figure 1:
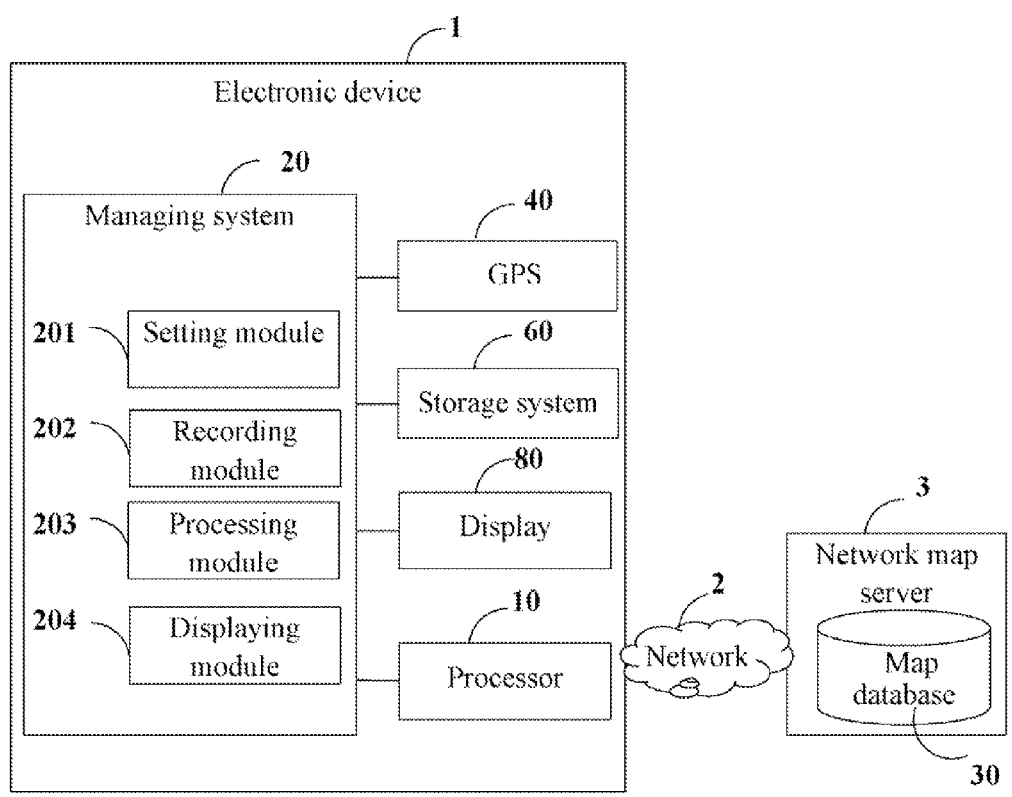
FIG. 1 is block diagram of one embodiment of an electronic device including a call records managing system.

FIG. 1 is block diagram of one embodiment of an electronic device 1 including a managing system 20. The managing system 20 may be used to mark a position of a call record of a call of the electronic device 1 on a map. The electronic device 1 connects to a network map server 3 through a network 2, so as to query a map database 30 on the network map server 3 to obtain the map. In one embodiment, the network 2 may be the Internet, LAN (local area network) or any other communication network.

In one embodiment, the electronic device 1 may be a mobile phone, a digital telephone, a telephone answering machine, a computer or any other kind of communication device. The electronic device 1 further includes a global position system (GPS) 40, a storage system 60, a display 80, and a processor 10. The GPS 40 may be used to locate a position of the electronic device 1. The storage system 60 may store various kinds of data, such as the call records and position information of the electronic device 1. In one embodiment, the storage system 60 may be a smart media (SM) card, a secure digital (SD) card, a compact flash card, or extreme digital card, and so on. The processor 10 executes one or more computerized operations of the electronic device 1 and other applications, to provide the functions of the electronic device 1.

In one embodiment, the managing system 20 includes a setting module 201, a recording module 202, a processing module 203, and a displaying module 204. The modules 201, 202, 203, and 204 may comprise one or more computerized codes to be executed by the processor 10 to perform one or more operations of the electronic device 1. Details of these operations will be provided below.

Figure 2:
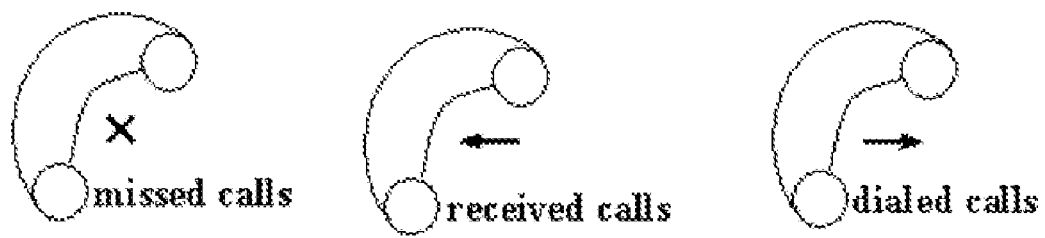
FIG. 2 is schematic diagram of an embodiment of virtual icons of the call records types of the electronic device of FIG. 1.

The setting module 201 presets a plurality of call types, and presets a virtual icon on the display 80 corresponding to each of the call types, in order to facilitate the user to view the call records. In one embodiment, the call types may include "missed calls," "received calls," and "dialed calls," for example. As shown in FIG. 2, there are three exemplary icons corresponding to the call types. Different kinds of icons may be selected to represent different kinds of call records according to user preference.

The recording module 202 obtains current position information of the electronic device 1 from the GPS 40 when a call of the electronic device 1 is established, and generates a call record when the call is finished. The recording module 202 further records the current position information corresponding to the call record. The call record may include, but are not limited to, the call type, the date and time of the call, a phone number and/or a contact name. The date of the call represents the system date and time of the electronic device 1 when the call is established. The time of the call represents a time length of the established call.

In one embodiment, the position information obtained from the GPS 40 may be represented using the DMS (degrees, minutes, and seconds) format. In the embodiment, the recording module 202 converts the position information using a conversion formula of $\{(D*60*60+M*60+S)*10\}$ to save storage space of the storage system 60 and improve efficiency of the storage system 60. Then the recording module 202 further stores the converted position information into the storage system 60.

Results of the conversion adopt a 0.1 seconds expression. In the conversion formula, D represents degrees of latitude and longitude coordinates, M represents minutes of the latitude and longitude coordinates, S represents seconds of the latitude and longitude coordinates. In one embodiment, referring to the longitude, a positive number represents east longitude, and a negative number represents a west longitude. Further referring to the latitude, a positive number represents a north latitude, and a negative number represents a south latitude.

For example, if the longitude coordinates of the position information is 121 degrees, 00 minutes, and 40.6 seconds, a conversion result is $(121*60*60+0*60+40.6)*10=4,356,406$, and the unit of the conversion result is 0.1 second. For another example, if latitude coordinates of the position information is 20 degrees 50, minutes, and 15.3 seconds, a conversion result is $(-20*60*60+50*60+15.3)*10=-750,153$, and the unit of the conversion result is 0.1 second.

Figure 3:
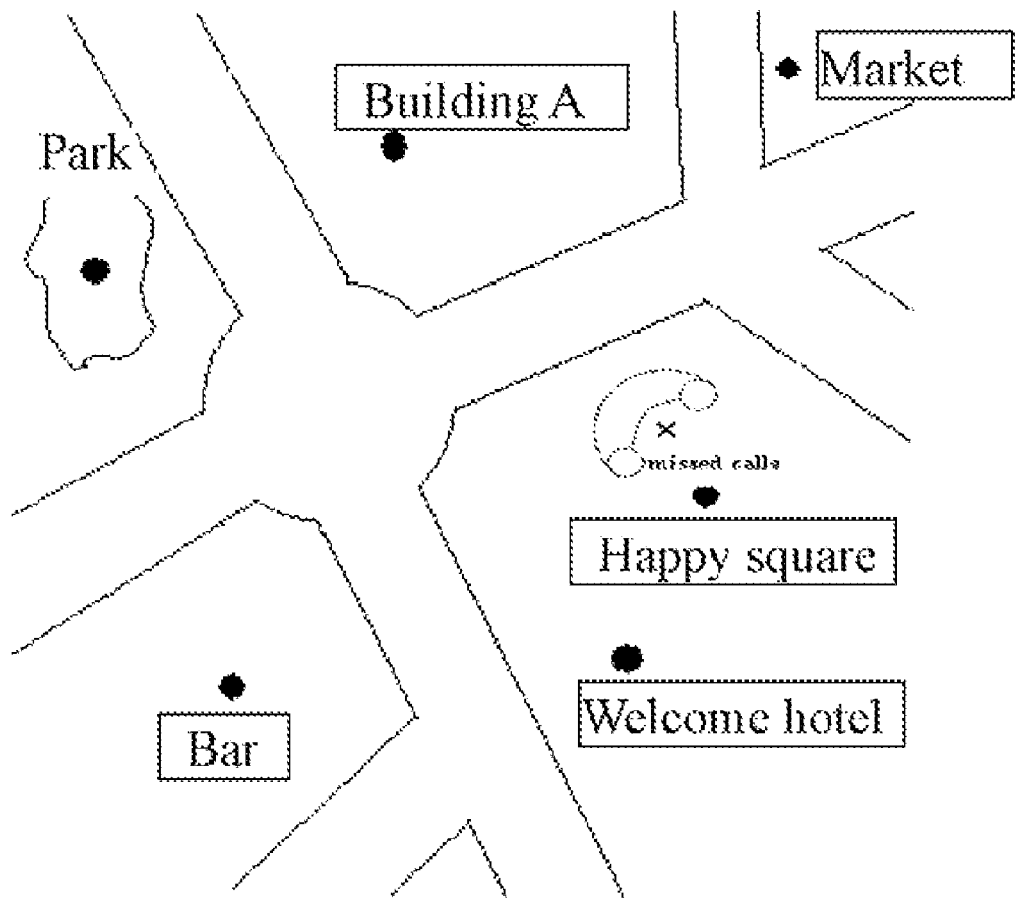
FIG. 3 is the schematic diagrams of one embodiment of displaying the virtual icon of the call types at the position of the call happened on the map.

The processing module 203 determines the call type of the call from the call record, and finds the location on a map of the electronic device 1 according the recorded position information, and marks the corresponding virtual icon at the location on the map on the display 80. In one embodiment, as shown in FIG. 3, for example, a call of the electronic device 1 took place at "happy square," and the recording module 202 records the call record that includes the call type "missed call." The recording module 202 obtains the current position information is the position information of "happy square." Then the processing module 203 determines the call type and finds the location "happy square", and marks a virtual icon of "missed calls" at the location "happy square" on the map. The electronic device 1 may query the map database 30 on the network map server 3 to obtain the map by connecting to the network 2.

The displaying module 204 displays the map marked with the virtual icon on the display 80, and displays details of the call record on the display 80 in response to receiving keystroke signals on the virtual icon on the marked location on the map from the user. The details of the call record comprise a call type, communication date and time, a phone number, and/or a contact name.

In one embodiment, when the details of the call records displayed on the display 80, the user may view the call information, and do some corresponding operation, such as, calling a phone number of the call record, for example.

Furthermore, the GPS 40 may be set to locate the position of the electronic device 1 periodically. For example, the GPS 40 may locate the position of electronic device 1 every minute. In one embodiment, if the GPS 40 does not locate the position of the electronic device 1 when a call is established, the recording module 202 may select the position information most closer to the time that the call has been established, and record the position information corresponding to the call.

Figure 4:
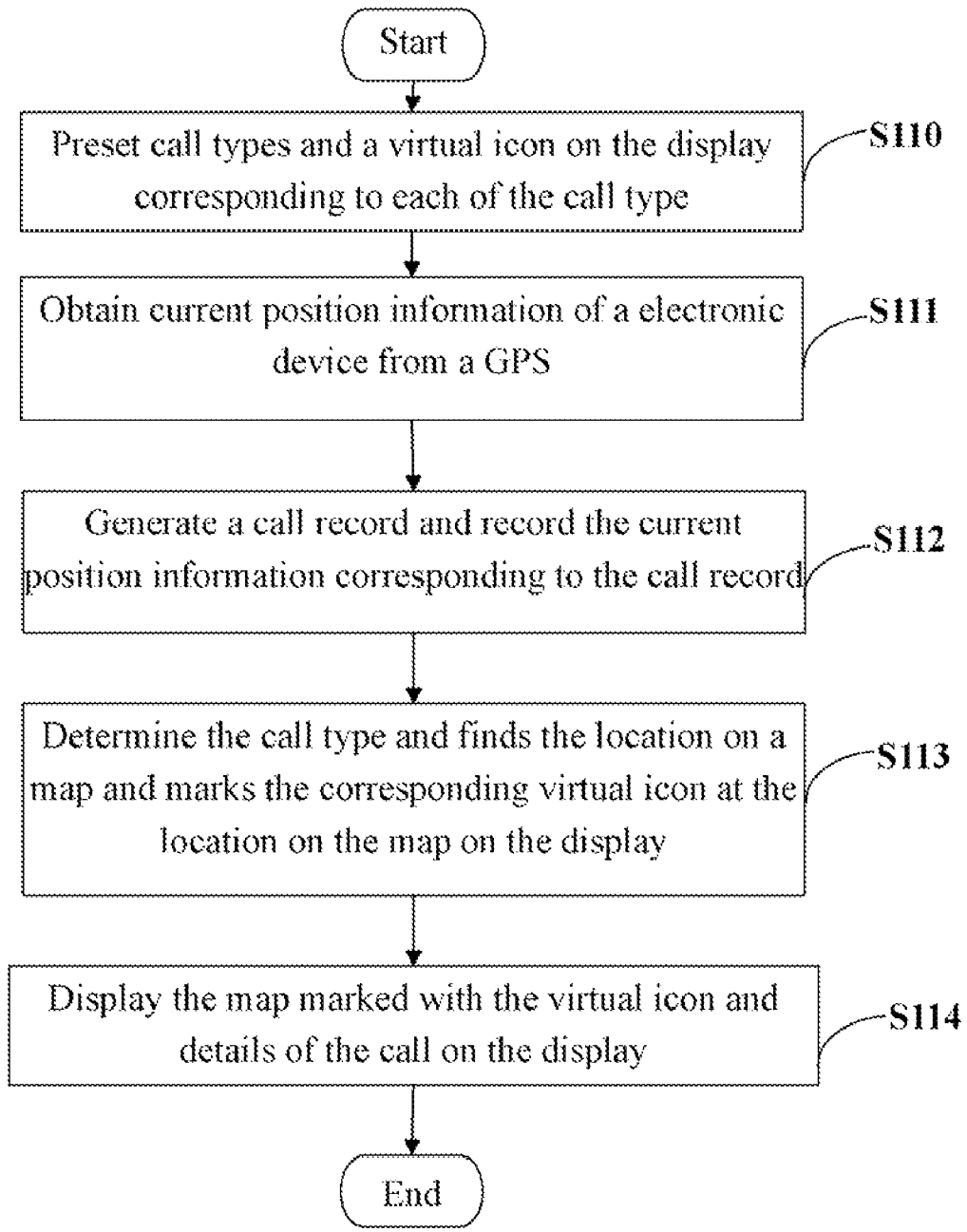
FIG. 4 is a flowchart of one embodiment of a method for managing call records in the electronic device of FIG. 1.

FIG. 4 is a flowchart of one embodiment of a method for managing call records in the electronic device 1. Depending on the embodiment, additional blocks may be added, others removed, and the ordering of the blocks may be changed. In block S110, the setting module 201 presets a plurality of call types, and presets a virtual icon on the display 80 corresponding to each of the call types in order to facilitate the user to view call records. As mentioned above, the call types may include "missed calls," "received calls," and "dialed calls," for example.

When a call of the electronic device 1 is established, in block S111, the recording module 202 obtains current position information of the electronic device 1 from GPS 40.

In block S112, the recording module 202 generates a call record when the call is finished, and records the current position information corresponding to the call record. As mentioned above, the call record may include, but are not limited to, a call type, communication date and time, a phone number and/or a contact name.

In block S113, the processing module 203 determines the call type of the call, and finds the location on a map of the electronic device 1 according the recorded position information, and marks the corresponding virtual icon at the location on the map on the display.

In block S114, the displaying module 204 displays the map marked with the virtual icon on the display 80, and displays details of the call record on the display 80 in response to receiving keystroke signals on the virtual icon on the marked location on the map from the user.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. An electronic device, comprising:
a global position system (GPS) operable to locate a position of the electronic device;
a storage system;
a display;
at least one processor; and
one or more programs stored in the storage system and being executable by the at least one processor, the one or more programs comprising:
a setting module operable to preset a plurality of call types, and preset a virtual icon on the display corresponding to each of the call types;
a recording module operable to obtain current position information of the electronic device from the GPS when a call of the electronic device is established, generate a call record when the call is finished, and record the current position information corresponding to the call record;
the recording module further operable to convert the current position information using a conversion formula of $\{(D*60*60+M*60+S)*10\}$, and store the converted position information into the storage system, wherein D representing degrees of latitude and longitude coordinates, M representing minutes of the latitude and longitude coordinates, and S representing seconds of the latitude and longitude coordinates; and
a processing module operable to determine the call type of the call from the call record, find the location on a map of the electronic device according the recorded position information, and mark the corresponding virtual icon at the location on the map on the display.

2. The electronic device as claimed in claim 1, wherein the one or more programs further comprise a displaying module operable to display the map marked with the virtual icon on the display.

3. The electronic device as claimed in claim 2, wherein the displaying module further displays details of the call record on the display in response to receiving keystroke signals on the virtual icon on the marked location on the map.

4. The electronic device as claimed in claim 3, wherein the details of the call record comprises a call type, communication date and time, a phone number, and/or a contact name.

5. The electronic device as claimed in claim 1, wherein the call types comprise missed calls, received calls, and dialed calls.

6. A computer-implemented method for managing call records used in the electronic device, the electronic device comprising a global position system (GPS) operable to locate a position of the electronic device, the method comprising:
presetting a plurality of call types, and presetting a virtual icon on the display corresponding to each of the call types;
obtaining current position information of the electronic device from the GPS when a call of the electronic device is established;
generating a call record, and recording the current position information corresponding to the call record when the call is finished;
converting the current position information using a conversion formula of $\{(D*60*60+M*60+S)*10\}$, and storing the converted position information into a storage system, wherein D representing degrees of latitude and longitude coordinates, M representing minutes of the latitude and longitude coordinates, and S representing seconds of the latitude and longitude coordinates; and determining the call type of the call from the call record, finding the location on a map of the electronic device according the recorded position information, and marking the corresponding virtual icon at the location on the map on the display.

7. The method as claimed in claim 6, further comprising:
displaying the map marked with the virtual icon on the display.

8. The method as claimed in claim 6, wherein the method further comprises:
displaying details of the call record on the display in response to receiving keystroke signals on the virtual icon on the marked location on the map.

9. The method as claimed in claim 6, wherein the details of the call record comprises a call type, communication date and time, a phone number, and/or a contact name.

10. The method as claimed in claim 6, wherein the call types comprise missed calls, received calls, and dialed calls.

11. A storage medium storing a set of instructions, the set of instructions capable of being executed by a processor to perform a method for managing call records of an electronic device, the electronic device comprising a global position system (GPS) operable for operable to locate a position of the electronic device, the method comprising:

presetting a plurality of call types, and presetting a virtual icon on the display corresponding to each of the call types;

obtaining current position information of the electronic device from the GPS when a call of the electronic device is established;

generating a call record, and recording the current position information corresponding to the call record when the call is finished;

converting the current position information using a conversion formula of $\{(D*60*60+M*60+S)*10\}$, and storing the converted position information into a storage system, wherein D representing degrees of latitude and longitude coordinates, M representing minutes of the latitude and longitude coordinates, and S representing seconds of the latitude and longitude coordinates; and determining the call type of the call from the call record, finding the location on a map of the electronic device according the recorded position information, and marking the corresponding virtual icon at the location on the map on the display.

12. The storage medium as claimed in claim 11, wherein the method further comprises:
displaying the map marked with the virtual icon on the display.

13. The storage medium as claimed in claim 11, wherein the method further comprises:
displaying details of the call record on the display in response to receiving keystroke signals on the virtual icon on the marked location on the map.

14. The storage medium as claimed in claim 11, wherein the details of the call record comprises a call type, communication date and time, a phone number, and/or a contact name.

15. The storage medium as claimed in claim 11, wherein the call types comprise missed calls, received calls, and dialed calls.

* * * * *